United States Patent [19]

Weisglass

[11] 3,880,520
[45] Apr. 29, 1975

[54] COLOR ENLARGER AND ILLUMINATING SYSTEM THEREFOR

[75] Inventor: Louis L. Weisglass, New York, N.Y.

[73] Assignee: Berkey Photo, Inc., Woodside, N.Y.

[22] Filed: Nov. 23, 1973

[21] Appl. No.: 418,726

[52] U.S. Cl. ............... 355/37; 355/71; 355/113
[51] Int. Cl. .............................. G03b 27/76
[58] Field of Search .................. 355/71, 37, 35, 113

[56] References Cited
UNITED STATES PATENTS

| 2,794,365 | 6/1957 | Baasner et al. | 355/35 |
| 3,630,609 | 12/1971 | Clapp et al. | 355/37 |
| 3,740,135 | 6/1973 | Weisglass | 355/71 X |
| 3,754,823 | 8/1973 | Weisglass et al. | 355/71 X |
| 3,754,824 | 8/1973 | Weisglass et al. | 355/71 X |
| 3,756,712 | 9/1973 | Weisglass et al. | 355/71 |

Primary Examiner—Richard A. Wintercorn
Attorney, Agent, or Firm—Toren, McGeady and Stanger

[57] ABSTRACT

In the disclosed enlarger, a mixing chamber mixes one or more light beams which have been partially colored by suitable filters so as to conform the color of a film or negative to printing paper. An exit opening in the chamber larger than the picture area of the film to be projected directs light toward the film, an objective lens, and the printing paper. A diffusion arrangement is removably mounted relative to the chamber and covers the exit opening. The arrangement includes a central diffuser which allows passage of light and a reflector that extends outwardly from the diffuser for reflecting light back into the chamber. The diffuser is composed of material distributed to achieve greater diffusion power near the center and lesser diffusion power toward the outer periphery of the diffuser. The diffusion arrangement is interchangeable with other diffusion arrangements whose diffusers are larger or smaller and whose respective reflectors extending therefrom are correspondingly smaller or larger, so that an operator can use the arrangement whose diffuser is closest in size to but larger than the film's picture area to be projected.

20 Claims, 7 Drawing Figures

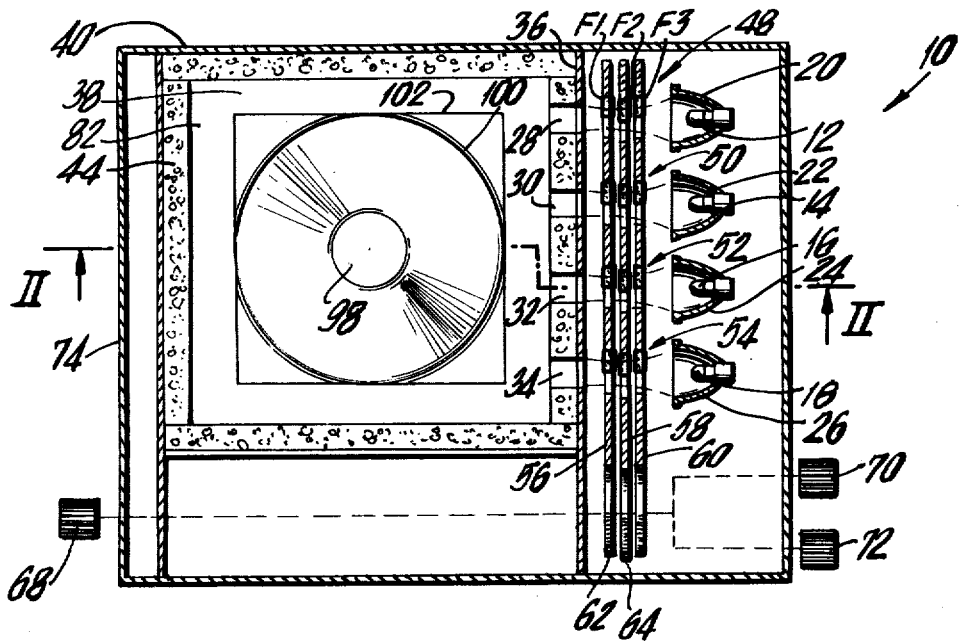
FIG. I
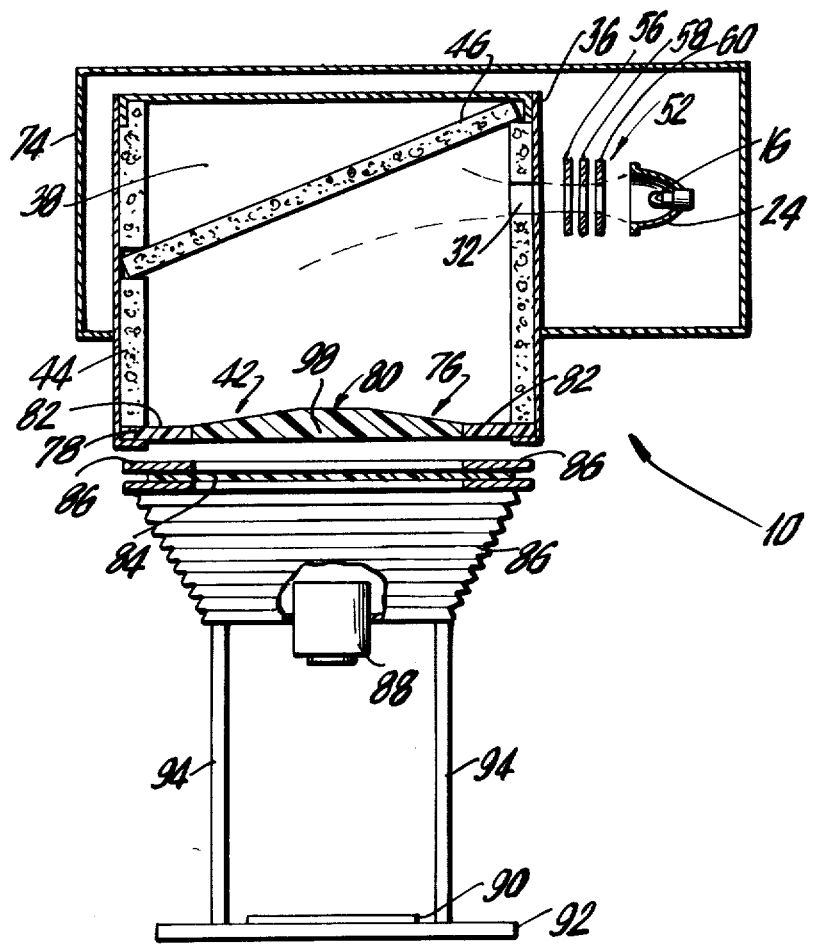
FIG. 2

COLOR ENLARGER AND ILLUMINATING SYSTEM THEREFOR

BACKGROUND OF THE INVENTION

This invention relates to projection apparatuses, and particularly to illuminating systems for color enlargers.

In such color enlargers an objective lens projects an image of a picture area of a color negative or film onto printing paper located at the lens' focal plane. In order to obtain the best possible print, the light which illuminates the negatives' or films' picture are must possess the correct intensity, chromaticity, and saturation for the particular film coloration and printing paper characteristics. U.S. Pat. No. 3,756,712 discloses a light coloring apparatus that appropriately colors a white light beam emerging from a source. In particularly, cyan, magenta, and yellow dichroic filters are adjusted to selected positions at which they intercept the white light beam and partially color the latter. A mixing chamber in the path of the beam mixes the colored and uncolored portions of the beam. A translucent diffuser transmits the mixed light from the chamber to the color negative or film.

In order to prevent the "hot spot" that light from the objective often creates at the center of the projected image, because the center of the lens is closer to the center of the projected image, the diffusion power of the diffuser is made greatest at the center, and decreased progressively toward the margins. Typically this is accomplished with a diffusion plate of homogeneous material having a given thickness at the center and becoming progressively thinner towards the periphery, as in the case of a comparatively flat frusto-conical diffuser.

The greater diffusion power at the center limits the intensity of the light toward the closer center portion of the printing paper while increasing the intensity toward the margins. The resulting projected image exhibits a uniform intensity. Without the greater central diffusion power, the intensity would fall off toward the margins as a raised cosine function of $\alpha$, i.e., $\cos^4\alpha$, where $\alpha$ represents the including angle from the center beam toward the corner beam.

While such a system is often effective, it has been found that adjustment of the enlarger to accommodate it to varying film sizes introduces new hot spots or other intensity nonuniformities. This is especially true with illuminating systems adapted for large size negatives.

Furthermore, efficiency losses results from using such systems with negatives substantially smaller than the diffuser because light, once it has left the mixing chamber through the diffuser cannot easily be reflected back. Means for for overcoming this difficulty are sometimes cumbersome.

An object of this invention is to overcome these difficulties.

Still another object of the invention is to improve projection apparatuses, Still another object of the invention is to improve color enlargers.

Yet another object of the invention is to improve color enlarger illuminating systems.

SUMMARY OF THE INVENTION

According to a feature of the invention, these objects are attained in whole or in part, by substituting one of a plurality of interchangeable diffusion arrangements removably mounted at the exit opening of the mixing chamber in place of the diffuser hiterto used. Each arrangement is composed of a centrally located diffusing plate surrounded by an opaque reflector that extends from the edges of the diffusing plate to the dimensions of the exit opening. Each arrangement covers the exit opening when interchangeably applied thereto by an operator. The diffusion plate sizes vary from one arrangement to another. An operator interchangeably uses the arrangement whose diffusion plate is larger than the picture area to be projected, but most closely approximates this picture area.

According to another feature of the invention, each diffusion plate has a diffusion power which is greatest at the center of the plate and decreases progressively toward the margins.

According to another feature of the invention each diffusion plate is composed of a homogeneous material having a given thickness at the center and becoming progressively thinner towards the periphery.

According to yet another feature of the invention, each diffusion plate has a frusto-conical shape.

According to another feature of the invention, the reflector surrounding each diffusion plate is composed of an opaque material painted white.

According to yet another feature of the invention, the illuminating system comprises source means forming a light beam, filter means in the path of only a portion of the beam, mixing chamber means having an opening in the path of the beam and having opaque reflective dispersing means for mixing the light of the beam entering the chamber means, the chamber means forming an opening larger than the area of the film being enlarged, diffusion means removably mounted on the chamber for covering the opening and allowing passage of light through one portion and reflecting light back into the chamber at another portion, the diffusion means including a translucent diffusion plate covering the central portion and an opaque reflector from the diffusion plate toward the edges of the exit opening, the diffusion plate having a diffusion material distributed to achieve a greater diffusion power near the center of the plate and a lesser diffusion power toward the outer periphery of the plate.

According to another feature of the invention, a plurality of diffusion means having diffusion plates and reflectors of different sizes are interchangeably mounted at the exit opening.

These and other features of the invention are pointed out in the claims. Other objects and advantages of the invention will become evident from the following detailed description when read in light of the accompanying drawings.

BRIEF DESCRIPTION OF THE DRAWINGS

FIG. 1 is a partly schematic sectional top view of an enlarger embodying features of the invention.

FIG. 2 is a section II—II of FIG. 1.

DESCRIPTION OF PREFERRED EMBODIMENTS

Figure 3:
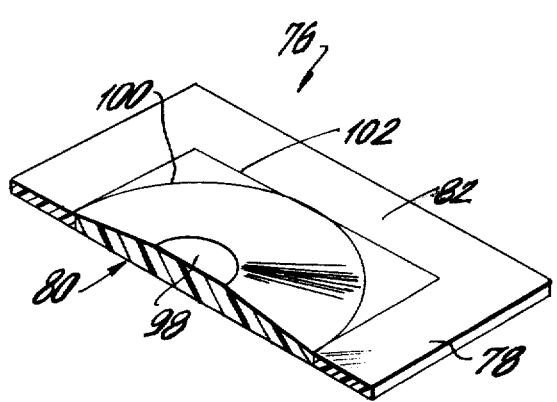
FIGS. 3, 4 and 5 are partly perspective, partly sectional views of diffusion arrangements used in FIGS. 1 and 2.

In the enlarging apparatus 10 of FIGS. 1 and 2, four light sources 12, 14, 16 and 18 together with substantially elliptical reflectors 20, 22, 24, and 26, direct four light beams toward respective entrance ports 28, 30, 32, and 34, of the port wall 36 in a mixing chamber 38. The mixing chamber is generally composed of a metal shell 40 having an exit opening 42 extending virtually across the bottom as shown in FIG. 2. Solid white expanded foam panels 44 line the front and side walls of the chamber while a ceiling or roof panel 46 extends angularly upward from the far end of the chamber toward the end closer to the entrance ports 28 to 34. The ceiling panel intercepts the light beams entering the entrance ports 28 and 34 so as to form a hyperbolic section of each beam.

The sources 12 to 18 and the reflectors 20 to 26 focus the respective beams so that they converge between the reflectors and the respective entrance ports 28 to 34. Four filter sets 48, 50, 52, and 54, each composed of three dichroic filters F1, F2, and F3, intercept respective portions of the beams from the reflectors 20 and 26 so as to impart an intense color to each intercepted portion of each beam. The filters F1, F2, and F3 in each set 48 to 54, pass the respective subtractive primary colors, cyan, yellow, and magenta. The filters F1, F2, and F3 are rigidly mounted on respective movable holder plates 56, 58, and 60, which are biased, by means not shown, against the peripheral surfaces of three rotatable cams 62, 64, and 66, so that each filter of reach color intercepts a corresponding portion of the respective beams determined by the rotary position of the cams 62 and 66 engaging their plates 56 to 60. Within each set, each of the filters F1, F2, and F3, may then intercept a different proportion of the beam. The like-designated filters such as F1 intercept substantially the same part of each beam. Suitable knurled knobs 68, 70, and 72 extending through the housing of the overall light mixer 74 are each coupled to one the cams. Thus an operator may set the positions of the filters F1 by turning the wheel 68. The positions of the respective filters F2 and F3 are set by setting the positions of the knobs 70 and 72.

A drum indicator, not shown, apprises the operator of the extent to which the knob 68 has been turned, and hence the extent to which the filter F1 intercept the respective beams. Similarly, drum indicators coupled to the knobs 70 and 72, indicate the extent to which these knobs have been turned and the corresponding extent to which the filters F2 and F3 enter the beam. It should be noted that the plates 56 to 60 are constructed to provide spaces adjacent the leading edges (i.e., the lower edges in FIG. 1,) which allow unobstructed passage of the remainder of each beam not intercepted by the filters.

Within the chamber 38, the opaque ceiling panel 46, composed of a white hardened foam material, disperses the partly colored beams in all directions. Together with the remaining panels 44, each of which corresponds to the panel 46, it bounces the light back and forth in all directions. Ultimately, the panels 44 and 46 mix the white portions of the beams with the colored portions so as to achieve a saturation dependent upon the overall degree to which the filters F1 to F3 in the sets 48 and 50 extend into the beam. The color of the resulting light, i.e., the saturation and chromaticity, is determined by the degree to which each filter extends into its respective beam relative to the other filters of its set.

Covering the exit opening 42 is a removable and interchangeable diffusion assembly or arrangement 76 composed of an opaque reflector 78 bonded to a translucent opal diffusion or scattering plate 80 that disperses and mixes light leaving the chamber at the exit opening 42. The opaque reflector 78 blocks a certain amount of the light attempting to leave by the exit opening 42. Thus the upper surface of the reflector 78 is painted white to reflect as much of the light as possible back into the mixing chamber and thereby increase the total light output.

The plate 80 diffuses the light as it passes through and illuminates an interchangeable color negative, slide, or film 84 mounted in a removable and interchangeable film carrier 86. The light from the negative 84 passes through adjustable bellows 86 to an adjustable objective lens 88. The latter focuses the light as modified by the film 84 upon printing paper 90 mounted on a paper carrier 92.

Suitable racks 94 support the upper projection portion of the enlarger 10 above the paper carrier 92. In the usual manner, the position of the projection portion of the enlarger is adjustable on the racks 66 by means of pinions for up and down movement. This adjusts the size of the image being focused upon the printing paper in the print carrier 64. The housing 74 can be removed from the enlarger for servicing and adjusting.

Suitable means operable from outside the housing 74 can withdraw all the filters simultaneously from the position shown in FIG. 1 out of the paths of the beams. This allows uncolored white light from the sources 12 to 18 and the reflectors 20 to 26 to illuminate the negative 84.

The translucent diffusion plate 80 in the assembly 76 tapers outwardly from a thick circular center 98 toward a thin, circular rim 100 as shown in FIGS. 1 and 2. From the circular rim 100, the material remains thin at the corner margins 102 which meet the reflector 78. According to another embodiment of the invention the plate 80 is thickened into a support frame where the margins 102 meet the reflector 78. The entire plate 80 is monolithic and composed of a diffusing or scattering material. The diffusion plate 80 exhibits a variable degree of diffusion, that is, the diffusion is greater at the center 98 and gradually tapers off towards the rim 100. The diffusion plate is constructed by molding or machining a material which has a diffusion characteristic that is a function of its thickness. Therefore, increasing the thickness increases the diffusion. To obtain the desired effect, it is then only necessary to produce a greater thickness at the center than towards the edges. According to one embodiment of the invention, an acrylic resin with minute reflective particles in suspension is used. Such a material has the desired characteristics of increasing diffusion with thickness.

Since it is the property of a diffuser to scatter in all directions, each ray of light impinging upon it, and the amount of scattering is related to the amount of diffusion, it follows that the variable diffusion plate 80 will scatter more of its light at the center and transmit more at its edges. As a result, more light is transmitted at the edges and less at the center.

This selective transmission at the edges as compared to the center has the effect of compensating for the fall-off in intensity which would occur at the printing paper 90 if a uniform diffuser were used. This fall-off with a uniform diffuser arises from the fact that light from the edges of the diffuser passing through the objective lens 88 to the edges of the paper 90 must travel a greater distance than light from the center of the diffuser to the center of the paper 90. The term diffuser here is used interchangeably with diffusing plate. The greater transmission at the edges of the diffusion plate 80 overcomes the otherwise diminished intensity at the edges of the paper 90.

The diffusion plate 80 returns some of the scattered light to the chamber while the remaining light passes through the diffuser. This effect is very desirable because a large percentage of light is scattered back toward the chamber by the center of the diffuser. At the edges, a large amount is transmitted and a smaller amount is reflected back. Aside from producing the uniformity the diffuser increases the efficiency, because when light is reflected back it is reflected by the panels or walls of the mixing chamber and eventually passes through the diffuser again. Thus the total light output of this system is raised significantly.

Ordinarily, light passing from the chamber 38 strikes the negative or film 84. When the film is smaller it is held in a film carrier 85 having larger borders.

Figure 4:
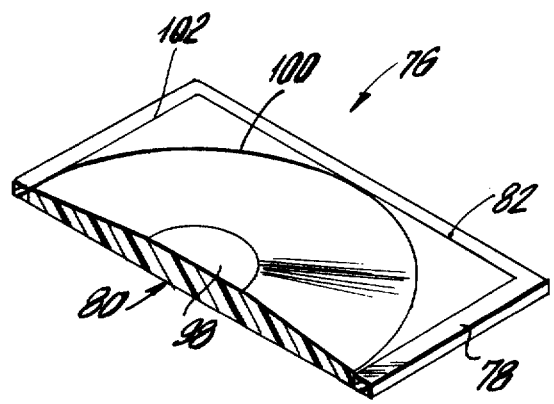
Figure 5:
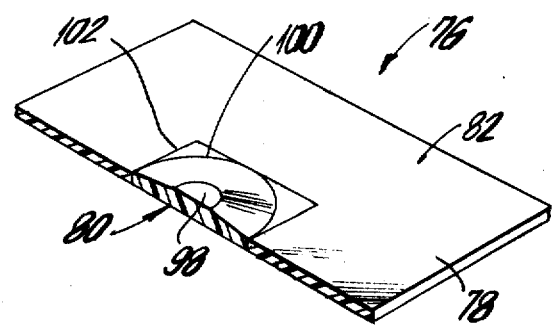

To accommodate different film sizes, or different areas to be enlarged, the enlarger 10 is provided with interchangeable assemblies 76, such as shown in FIGS. 3, 4, and 5. When the film size, or the area of the film to be enlarged is changed, an operator removes the assembly 76 mounted in the enlarger, and replaces it with an assembly 76 whose diffusion plate 80 corresponds in size to the film or area to be enlarged.

This interchangeability and replacement produces uniform light intensity on the image received by the print 90 regardless of the size of the negative or the area being projected. It allows adjustment of the enlarger housing and the objective lens 88 to change the magnification of the system so that the size of the prints made from small negatives or film areas, can be as large as prints from larger films or areas, while nevertheless maintaining the uniformity of the intensity at the printing or focusing plane. This interchangeability is particularly true where the cross-section of the diffusion plate is frusto-conical. If only a small negative area were to be projected from directly beneath the truncated portion of the cone, the area to be projected would be uniformly illuminated and subject to the cosine-law fall-off resulting from the longer distances to the marginal portion of the print. Providing a smaller diffusion plate 80 such as shown in FIG. 5 compensates for this additional fall-off.

Moreover, the smaller diffusion plate such as shown in FIG. 5 can be thinner in the center than the plate shown in FIG. 4. This further increases the efficiency of the system by reducing losses within the plate.

As a further point, the surfaces 82 efficiently reflect the light outside the negative area margins back into the mixing chamber 38. This relieves the upper surfaces of the film carrier 86 of much of this task. It limits the loss of light reflected upwardly from the upper surface of the carrier 86 and subsequently reflected downwardly by the lower surface of the plate 80. This loss occurs when the film carrier borders are wide enough to accommodate a film size smaller than the diffusion plate 80. The corresponding film and diffuser areas limit this loss.

Figure 6:
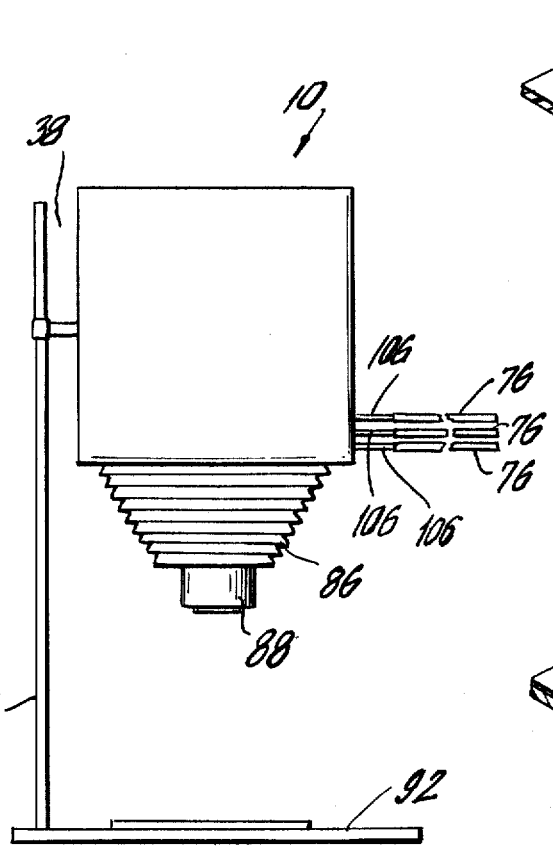
FIG. 6 is a partly schematic elevational view of another enlarger embodying features of the invention.

FIG. 6 illustrates another embodiment of the invention. Here the enlarger 10 corresponds to the enlarger shown in FIGS. 1 and 2. However, the assemblies 76 are swingably mounted on respective arms 106, 108, and 110. Each of the assemblies 76 has a different size of diffusion plate 80 mounted with a complementarily sized reflector 78. An operator simply swings one assembly into the enlarger as required.

The enlarger of FIGS. 1 and 2, together with the interchangeable assemblies 76 of FIGS. 3, 4, and 5, constitute a single enlarger system. In operation, an operator selects the assembly 76 with the diffusion plate 80 having a size equal to or larger than the film area to be projected on the paper 90 but as close as possible in size to the film area. If the selected assembly is not already in the enlarger, the operator removes the mounted assembly and replaces it with the selected assembly. In FIG. 6 this is done by swinging the arms 106. The operator then aligns the area of the film 84 to be projected with the diffuser 80 and operates and enlarger in the usual manner.

According to an embodiment of the invention, the number of assemblies 76 and the number of sizes of diffusers 80 is large, such as 12, so as to provide a greater likelihood of matching the diffuser size with the picture area size. In this embodiment, the diffusers shown in FIGS. 3 to 5 represent only three of the larger number of diffusers available. The remaining diffusers for this embodiment are not shown.

It is possible that portions of the carrier 86 will extend under the selected diffuser 80 even with careful diffuser size selection. This is especially true when the film size is not square but rectangular and the diffuser 80 is square. According to an embodiment of the invention, the top surface of the carrier is painted white to reflect the light incident thereon back into the mixing chamber 38. The bottom of the diffuser is made with a mat finish to admit some of the light being reflected and to limit downward reflection of the diffuser bottom. These aspects of the invention maintain the efficiency of the enlarger. When the diffuser size is selected only to cause illumination of a small portion of the film, (such as when only a portion of the film is being printed) problems concerning reflections of this type are avoided.

According to an embodiment of the invention, the enlarger system includes interchangeable assemblies 76 with diffusers corresponding in size to the picture areas of all standard film sizes.

Figure 7:
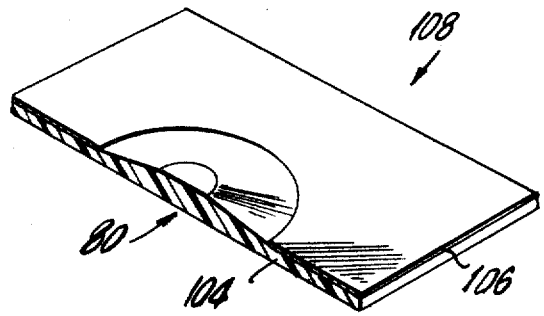
FIG. 7 illustrates another form of the diffusion arrangement in FIGS. 1 to 5.

According to an embodiment of the invention, the plate 80 and the reflector 78 may be formed from a single diffusion member 104 whose top is covered with white paint 106 in the area normally occupied by the reflector 78. The device 108 is shown in FIG. 7. A layer below the white paint may be used to enhance the opacity of the reflecting portion of the assembly. According to an embodiment of the invention, a number of devices 108 are substituted for the assemblies 76 in FIGS. 1 to 6.

The invention improves projection apparatuses generally and color enlargers in particular. It results in a substantial improvement in color enlarging illuminating systems. It permits the best possible light distribution for various negative sizes. It also permits recovery of light coming from unused portions of the negative reflected back into the mixing chamber.

While embodiments of the invention have been described in detail, it will be obvious to those skilled in the art that the invention may be embodied otherwise without departing from its spirit and scope.

What is claimed is:

1. An illumination system for an enlarger whose objective lens projects an image of a picture area of a film onto a focusing plane, comprising source means forming a light beam, filter means in the path of only a portion of the beam for coloring a part of the beam, mixing chamber means having an entrance opening in the path of the beam beyond the filter means and having opaque reflective dispersing means for mixing the light of the beam entering said chamber means, said chamber means forming an exit opening larger than the picture area and directing light toward the film and the objective lens, and light control means removably mounted on the chamber and covering the opening when mounted on the chamber and allowing passage of light through a central portion of the opening and reflecting light impinging at a second portion covering the remainder of the opening, said control means including reflecting means along the second portion for reflecting light back into the chamber and a transparent diffuser covering the central portion, said diffuser having diffusion material distributed to achieve a greater diffusion power near the center thereof and a lesser diffusion power toward the outer periphery thereof.

2. An apparatus as in claim 1, wherein said central portion is substantially equal to the size of the picture area.

3. An apparatus as in claim 1, wherein said system includes a plurality of control means each having reflecting means whose outer periphery has the same dimensions and each having a central portion and a second portion differing in size from the central portion and second portion of the other control means, said control means being interchangeable for each other so that an operator can utilize the control means with the diffuser larger than the picture area but closer in size to the picture area than the next larger diffuser.

4. An apparatus as in claim 1, wherein said enlarger includes a plurality of source means for producing a plurality of beams, and a plurality of filter means each in the path of one of the beams, said mixing chamber having a plurality of entrance openings each in the path of one of the beams.

5. An apparatus as in claim 3, wherein said enlarger includes a plurality of source means for producing a plurality of beams, and a plurality of filter means each in the path of one of the beams, said mixing chamber having a plurality of entrance openings each in the path of one of the beams.

6. A system as in claim 1, wherein said diffuser is in the form of a plate and said reflecting means includes a plate surrounding the diffuser and bonded to the diffuser.

7. A system as in claim 1, wherein said diffusion material extends integrally outward from the diffuser and said reflecting means includes a reflecting opaque layer covering the extension of the diffusion material.

8. An apparatus as in claim 5, wherein said diffuser is in the form of a plate and said reflecting means includes a plate surrounding the diffuser and bonded to the diffuser.

9. An apparatus as in claim 5, wherein said diffusion material extends integrally outward from the diffuser and said reflecting means includes a reflecting opaque layer covering the extension of the diffusion material.

10. An illumination system for an enlarger whose objective lens projects an image of a picture area of a film onto a focusing plane, comprising source means forming a light beam, filter means in the path of only a portion of the beam, mixing chamber means having an opening in the path of the beam beyond said filter means and having opaque reflective dispersing walls for mixing the light of the beam entering said chamber means, said chamber means forming an exit opening larger than the size of the picture area, and light control means for covering the opening and allowing passage of light through a first portion of the opening while reflecting light impinging on a second portion of the opening surrounding the first portion and extending from the first portion toward the periphery of the opening, said control means including a plurality of assemblies each having centrally located diffuser and surrounding reflector extending from the diffuser outwardly, said diffuser in each assembly having diffusion material distributed to achieve a greater diffusion power near the center of the diffuser and a lesser diffusion power toward the outer periphery of the diffuser, said assemblies being interchangeably mounted across the exit opening so as to illuminate the picture area of the film while reflecting light emerging from the opening toward the areas surrounding the picture area.

11. An apparatus as in claim 10, wherein said enlarger includes a plurality of source means forming a plurality of beams and a plurality of filter means each intercepting respective one of said beams, said chamber means having a plurality of filter means each intercepting respective one of said beams, said chamber means having a plurality of entrance openings.

12. An apparatus as in claim 10, wherein said control means includes a plurality of supports each movably holding one of said assemblies relative to said chamber means and allowing interchangeability of said assemblies relative to said chamber means.

13. An apparatus as in claim 12, wherein said enlarger includes a plurality of source means forming a plurality of beams and a plurality of filter means each intercepting respective one of said beams, said chamber means having a plurality of filter means each intercepting respective one of said beams, said chamber means having a plurality of entrance openings.

14. An apparatus as in claim 11, wherein the size of the assembly used has diffuser which is larger than but corresponds most closely to the size of the picture area.

15. A system as in claim 10, wherein in each assembly said diffuser is in the form of a plate and said reflecting means includes a plate surrounding the diffuser and bonded to the diffuser.

16. A system as in claim 10, wherein for each assembly said diffusion material extends integrally outward from the diffuser and said reflecting means includes a reflecting opaque layer covering the extension of the diffusion material.

17. An enlarger, comprising an illuminating system, a film carrier located adjacent the illuminating system, an objective lens, and means for supporting said illuminating system and said objective lens relative to a printing plane; said enlarger including source means forming a light beam, filter means in the path of only a portion of the beam, mixing chamber means having an opening in the path of the beam beyond said filter means and having opaque reflective dispersing walls for mixing the light of the beam entering said chamber means, said chamber means forming an exit opening larger than the size of the picture area, and light control means for covering the opening and allowing passage of light through a first portion of the opening while reflecting light impinging on a second portion of the opening surrounding the first portion and extending from the first portion toward the periphery of the opening, said control means including a plurality of assemblies each having a centrally located diffuser and a surrounding reflector extending from the diffusion plate outwardly, said diffuser in each assembly having diffusion material distributed to achieve a greater diffusion power near the center of the diffuser and a lesser diffusion power toward the outer periphery of the diffuser, said assemblies being interchangeably mounted across the exit opening so as to illuminate the picture area of the film while reflecting light emerging from the opening toward the areas surrounding the picture area.

18. An enlarger as in claim 17, wherein for each assembly said diffuser is in the form of a plate and said reflecting means includes a plate surrounding the diffuser and bonded to the diffuser.

19. An enlarger as in claim 17, wherein for each assembly said diffusion material extends integrally outward from the diffuser and said reflecting means includes a reflecting opaque layer covering the extension of the diffusion material.

20. A projector for projecting an image of a picture area of a film onto a focusing plane, film carrier means for carrying the film, housing means, an objective lens mounted in the housing means for projecting the image of the picture area in the film, illuminating means for illuminating the picture area, said illuminating means including a light source having a light opening larger than the picture area, said illuminating means including diffusion means removably mounted at the opening and covering the opening when mounted on the opening, said diffusion means including a translucent diffuser and a reflector extending from the edges of the diffuser to the edges of the opening, said diffuser having a diffusion material distributed to achieve a greater diffusion power near the center of the diffuser and a lesser diffusion power toward the outer periphery of the diffuser.

* * * * *